United States Patent [19]

Diminnie et al.

[11] 4,059,325

[45] Nov. 22, 1977

[54] TERMINAL PROTECTION SHIELD

[75] Inventors: Edward A. Diminnie; Patrick J. Dellario, both of Louisville, Ky.

[73] Assignee: General Electric Company, Louisville, Ky.

[21] Appl. No.: 749,726

[22] Filed: Dec. 13, 1976

[51] Int. Cl.$^2$ ....................... H01B 17/26; H01R 5/04; H02H 7/08

[52] U.S. Cl. ......................... 339/94 A; 174/152 GM; 339/126 RS; 339/175 R

[58] Field of Search .............. 339/94 A, 94 M, 102 R, 339/116 R, 116 C, 143 R, 145 R, 176 R, 126 R, 126 S, 258 P, 275 R; 174/18, 55, 151, 152 GM

[56] References Cited

U.S. PATENT DOCUMENTS

| | | | |
|---|---|---|---|
| 3,586,910 | 6/1971 | Sauber | 339/126 RS X |
| 3,605,076 | 9/1971 | Dozier | 339/126 RS |
| 3,721,948 | 3/1973 | Brandt et al. | 339/176 R |
| 3,853,390 | 12/1974 | DeKoeyer et al. | 339/275 R |

*Primary Examiner*—Roy Lake
*Assistant Examiner*—E. F. Desmond
*Attorney, Agent, or Firm*—Frank P. Giacalone; Francis H. Boos

[57] ABSTRACT

An electrical terminal assembly for use in conducting current through the wall of a sealed motor compressor unit and more particularly to a shield of dielectric material arranged on said terminal assembly so as to prevent contaminants when present in said motor compressor unit from depositing on said terminal assembly.

3 Claims, 4 Drawing Figures

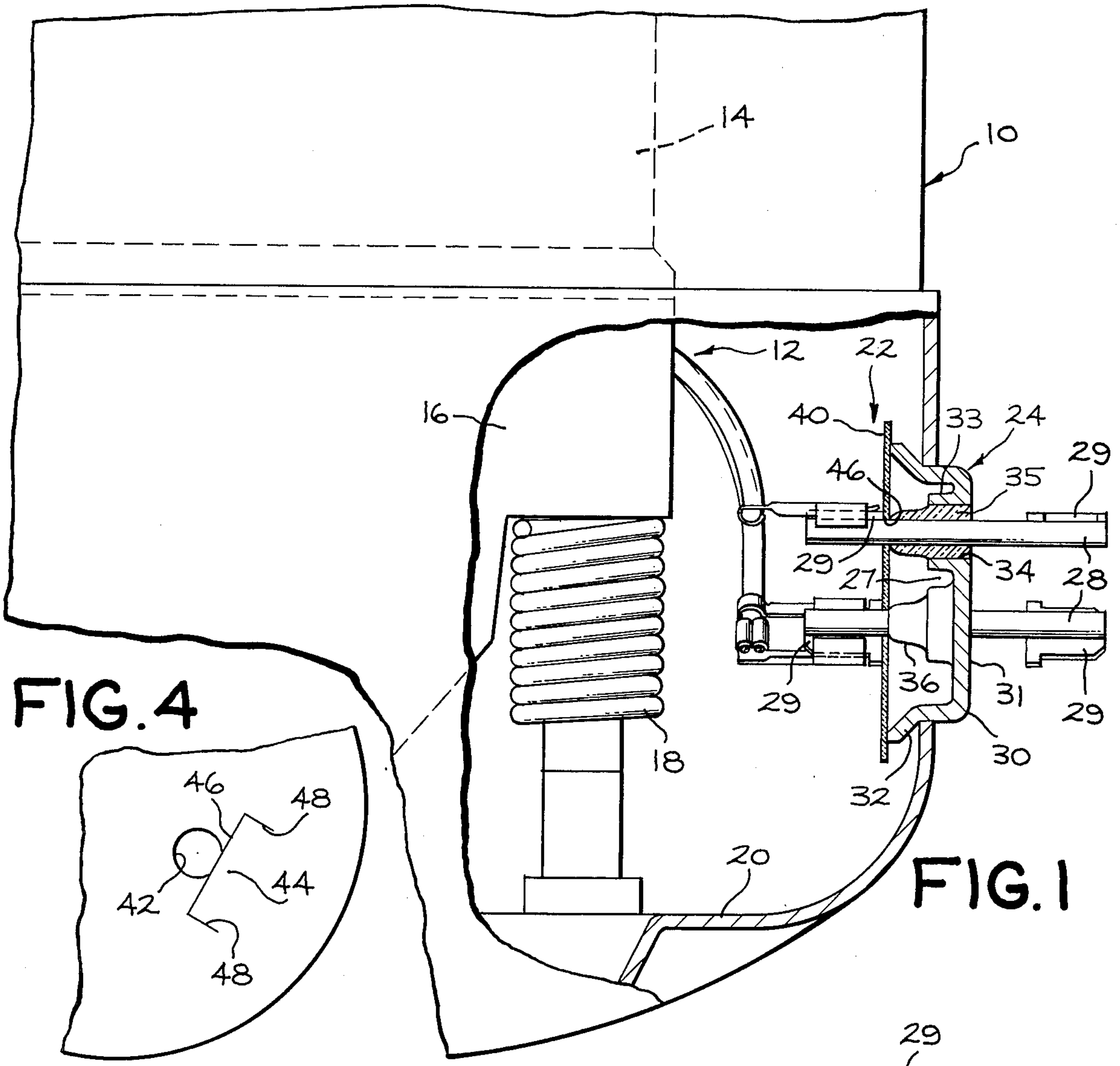
FIG.4
FIG.1
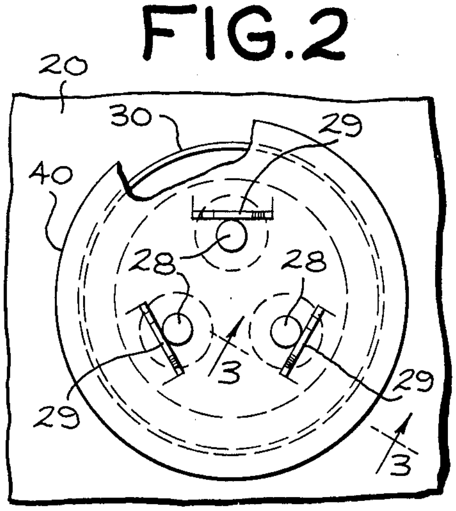
FIG.2
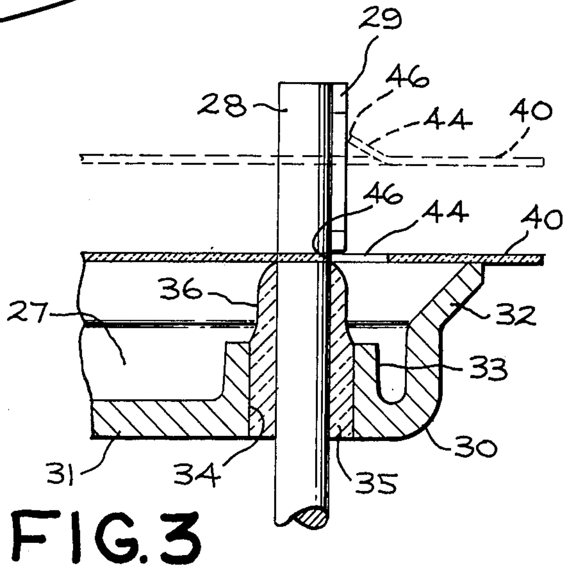
FIG.3

TERMINAL PROTECTION SHIELD

BACKGROUND OF THE INVENTION

Current terminal assemblies for making electrical connections to the motor component of a hermetic motor compressor unit include a plurality of conductor pins projecting through spaced apertures in a metal body member and hermetically sealed thereto are glass-to-metal seals. These terminal assemblies, as described for example in U.S. Pat. No. 3,160,460-Wycenbeek, include a cup-shaped metallic body member adapted to be inserted in an opening in a hermetic casing with the open end facing the interior of the casing and the side walls hermetically attached to the casing as by resistance welding. During operation of a hermetic compressor unit as part of the refrigeration system, metallic particles in a system are attracted to the surface of the glass insulator beads forming the glass-to-metal seals by a phenomenon known as electrophoresis and these particles form buildup on the surface of the glass to the point that an electrical conductive path is established resulting in a short circuit causing a terminal failure. Further contaminants within the system, such as moisture and acidic components such as halogen acids resulting from a partial decomposition of the halogenated hydrocarbon refrigerant, may also directly attack the glass surfaces causing or contributing to the electrical breakdown. Other causes of electrical breakdown of the terminal assembly is in the event of compressor motor failure. In this instance a carbon mixture often deposits on the inside of the hermetic terminal forming a conductive path between the terminal pins and ground. The carbon is generated by the high temperatures resulting during motor failure.

This problem may in part be aggravated in that presently available terminal assemblies include a generally cup-shaped body member with the recess portion facing the motor compressor unit. While the side walls of the cup-shaped terminal provide a convenient means of securing the assembly to the compressor case it should be noted that contaminants may collect and accumulate in the recess area.

For the purpose of preventing failure of terminals through integration of the glass U.S. Pat. No. 3,551,191-Elbling et al proposes coating at least the glass beads or bushing portions of the terminal with an impervious coating of an expoxy resin. While such a coating does protect the glass surfaces and prevent deterioration thereof by acidic disintegration, it does not materially decrease the potential tracking distance between terminals or prevent metallic particles from being attracted to the vicinity of the terminals with the formation of short circuiting electrically conductive paths. Another attempt at preventing failures of the terminal through disintegration of the glass is disclosed in U.S. Pat. No. 3,721,948-Brandt et al, assigned to the General Electric Company, the assignee of the present invention. Means are provided by this patent to substantially increase the over-surface distance between the terminal and the terminal grounds. This included providing sleeves of insulating material which surrounded each of the terminals in spaced relationship. While this attempt did in fact increase the over-all surface distance between the terminals, it involves the use of several extra parts that must be especially made, and require added steps in the assembly of the terminal.

While prior art terminals may prevent motor failure during the life of the compressor motor by accommodating a normal amount of contaminants expected to be found in a hermetic refrigeration system they have been found lacking during major catastrophic motor failures that generally produce large quantities of carbon that in effect completely cover or coat the cup-shaped area and particularly the glass seal areas between the conductor pins and terminal body of the terminal assembly.

Since these failures would occur during extremely high temperatures found or experienced during motor failures in the neighborhood of 2,000° F., it can easily be understood that a blown pin will permit the extremely hot high pressure refrigerant to escape violently from the hermetic compressor casing. This high temperature fluid escaping under pressure may present a potential source of danger that could cause considerable damage in certain circumstances.

Accordingly, by the present invention, means are provided in a terminal assembly that will prevent terminal blowout during extreme motor failure conditions by isolating the vulnerable recess area of the terminal assembly from the motor compressor unit area.

SUMMARY OF THE INVENTION

In accordance with the illustrated embodiment of the present invention, there is provided in a hermetically enclosed motor compressor assembly having a housing provided with an opening in which is disposed an electrical terminal having a cup-shaped metal body member including an area formed by a side wall and an end wall with the area facing into the housing. The end wall is provided with a plurality of spaced apertures in which metal conductor pins are arranged. The conductor pins extend through the area to a position past the free end of the side walls. Insulating glass seals hermetically seal the pins to adjacent portions of the end wall.

Connector pins including tabs secured thereto are arranged so that one end of the tab is adjacent the free end of the conductor pin while the other end is spaced a predetermined distance relative to a plane defined by the free end of the side wall. The means for preventing failure of the terminal include a flexible shield member having a surface area at least as great as the body member. Arranged on the shield are a plurality of apertures equal in number and spacing to the connector pins. Resilient latch means are formed on the shield adjacent the apertures. The latch means are in alignment with the tabs and allow passage of the shield member over the connector means. Once past the tabs, the latching members snap under the lower edge of the tabs so that the shield is trapped between the lower end of the tabs and the free end of the side wall and accordingly maintain the shield against the free end of the side wall so that the area formed by the side wall is isolated from the motor compressor unit.

BRIEF DESCRIPTION OF THE DRAWING

In the accompanying drawing:

FIG. 1 is a fragmentary side view of a terminal assembly incorporating the present invention as installed in a hermetic compressor side wall;

FIG. 2 is a plan view of the inner side of a terminal showing the shield of the present invention in place;

FIG. 3 is a fragmentary sectional view of the terminal assembly taken generally along lines 3—3 of FIG. 2; and FIG. 4 is a portion of the present terminal assembly shield showing certain details of construction.

DESCRIPTION OF THE PREFERRED EMBODIMENT

Referring now to the drawings, wherein a preferred embodiment of the invention has been shown and particularly to FIG. 1, the basic component of the refrigerant compressor assembly 10 are of conventional construction and include a motor compressor unit 12 comprising an upper motor section 14 and a lower compressor section 16. The entire unit may be supported as shown on spring assemblies 18 connected to the compressor case or shell 20. In order to electrically connect the motor 14 to an electrical power source there is provided a connector assembly 22 consisting of a cup-shaped terminal assembly 24 mounted directly on the side wall of the case 20. The terminal assembly 24 in connection with the present invention, is provided with a plurality of conductor pins 28, three such pins being used in the present application of the invention. The terminal assembly as shown in FIGS. 1 and 2 of the drawing comprises a metal body member 30 including a flat end wall 31 bounded by a cylindrical side wall 32 defining an inner area 27. The side walls 32 can be secured as by welding to the compressor case 20 with the area 27 facing inwardly. The conducter pins 28 extend through the body 30 and are electrically insulated therefrom. The conducter pins 28 are positioned to project through the terminal 24 in both directions with each of the ends thereof being provided with flat pads or flags 29.

The end wall 31 of the body member 30 includes three inwardly extending collars 33 defining a plurality of spaced apertures 34 for respectively receiving the conductor pins 28. These conducter pins are secured to the body and electrically insulated therefrom by means of glass beads or bushings 35 which is fired to effect a glass-to-metal seal between the pins and the collars. In many commercially available terminal assemblies the portion of the glass seal on the inner side of the terminal assembly is somewhat cone-shaped as indicated by the numeral 36 or, in other words, extends somewhat inwardly from the inner ends of the collars 33.

While the application of an insulating and protective coating to the inner surfaces of the terminal assembly as proposed in the aforementioned U.S. Pat. No. 3,551,191, serves to protect the exposed glass surfaces from acidic attack and while the sleeve members disclosed in U.S. Pat. No. 3,721,948 substantially increase the over-surface distances between the terminals and the ground, the glass beading in both instances is vulnerable to catastrophic failures of the motor wherein extremely heavy carbon deposits may result.

In accordance with the present invention, means are provided on the inner side of the terminal assembly for protecting the inner terminal surface by sealing them within the body member and rendering them inaccessible from the compressor casing. This means comprises as shown in the drawings, an electrically insulated shield member 40.

The shield member 40 is dimensioned so that its distal edges extend to or beyond the cylindrical side wall 32 of the terminal assembly 24. Arranged on the shield member 40 are a plurality of apertures 42 equal in number and spacing to the conductor pins 28. Associated with each of the apertures 42 is a resilient latch or flap 44 which, as will be explained hereinafter, is adapted to engage the lower edge 46 of the flags 29. The flaps 44 are defined by a leading edge portion 46 which is cut tangent to its cooperating aperture 28, and side cuts 48 extending substantially perpendicular from each end of edge portion 46. As can be easily seen and understood, each of the apertures 42 and portion 46 are dimensioned and arranged to align with a cooperating conductor pin 28 and its flag 29.

In practice the member or shield 40 is placed over the terminal assembly 24 with its aperture 42 in alignment with cooperating conductor pins 28. As the shield 40 is moved downwardly in FIG. 1 the flaps 44 flex as shown in dotted lines to accommodate the flags 29. With the continued travel of shield member 40 downwardly conductor pins 28, the flaps 44 snap under and engage the lower edges 46 of flags 29 to latch the shield 40 to the terminal assembly 24. The axial position of the lower edge portion 46 of flag 29 is arranged relative to a plane defined by the free end of side wall 32 a distance that will effectively maintain the shield 40 securely against the free edge portion side wall 32 when the flap 44 is latched under the lower edge portion 46 of flag 29.

In summary, by the shield 40 of the present invention there is provided an effective means for isolating the area 27 from the motor compressor unit. As mentioned hereinbefore, the isolation of area 27 prevents carbon and contaminants from depositing and accumulating in large enough quantities during motor failure to cause an electrical short between terminals and an ensuing terminal blowout.

The foregoing is a description of the preferred embodiment of the invention. In accordance with the Patent Statutes, changes may be made in the disclosed apparatus and the manner in which it is assembled without actually departing from the true spirit and scope of this invention, as defined in the appended claims.

What is claimed is:

1. In a hermetically enclosed motor compressor assembly having a housing provided with an opening, an electric terminal having a cup-shaped metal body member including an area formed by an end wall and a circumferentially arranged side wall extending axially therefrom, said terminal being disposed in said opening with said area exposed to said housing, said end wall being provided with a plurality of spaced apertures, metal conductor pins arranged in said apertures substantially perpendicular to said end wall, one end portion of said conductor pin extending through said area to a position past the free end of said side wall, insulating seals hermetically sealing said pins to adjacent portions of said end wall, the improvement comprising:

connector means including tabs secured on said conductor pins being dimensioned so that one end of said tab is adjacent the free end of said pin and having their other end spaced from said area a predetermined distance relative to a plane defined by the free end of said side wall, a flexible shield member of dielectic material having a surface area at least equal to the area of said metal body member defined by said circumferentially disposed side wall;

a plurality of connector means receiving apertures arranged in said flexible shield member being equal in number and spacing to said connector means;

resilient latch means formed on said shield means adjacent said receiving apertures and being in alignment with said tabs for allowing passage of said shield member over said connector means including said tabs, and for latching under the other end of said tabs when said shield contacts the free end of said side wall for maintaining said shield against the free end of said side wall so that said area is isolated from said housing.

2. The invention as defined in claim 1 wherein:

said shield has a greater surface area than said metal body member and its outer peripheral edge extends beyond the outer dimensions of the side wall of said body member.

3. The invention as defined in claim 2 wherein:

said other end of the tab extends into said plane to a position in said area defined by said side wall.

* * * * *